United States Patent
Cai et al.

(10) Patent No.: US 10,041,229 B2
(45) Date of Patent: Aug. 7, 2018

(54) SYSTEM AND METHOD FOR CONTROLLING OPERATION OF MACHINE

(71) Applicant: Caterpillar Inc., Peoria, IL (US)

(72) Inventors: Zhijun Cai, Dunlap, IL (US); Bradley K. Bomer, Pekin, IL (US); Jeffrey S. Alig, Metamora, IL (US); Aaron R. Shatters, Montgomery, IL (US); Eric Cler, Oswego, IL (US); Brad R. Van De Veer, Washington, IL (US); Thomas E. Beccue, Germantown Hills, IL (US)

(73) Assignee: Caterpillar Inc., Deerfield, IL (US)

( * ) Notice: Subject to any disclaimer, the term of this patent is extended or adjusted under 35 U.S.C. 154(b) by 471 days.

(21) Appl. No.: 14/929,964

(22) Filed: Nov. 2, 2015

(65) Prior Publication Data

US 2017/0121946 A1 May 4, 2017

(51) Int. Cl.
| | |
|---|---|
| *E02F 9/26* | (2006.01) |
| *E02F 9/20* | (2006.01) |
| *F16H 61/16* | (2006.01) |
| *B60R 1/00* | (2006.01) |
| *H04N 7/18* | (2006.01) |
| *G06K 9/00* | (2006.01) |
| *E02F 3/34* | (2006.01) |

(52) U.S. Cl.
CPC ............... *E02F 9/261* (2013.01); *B60R 1/00* (2013.01); *E02F 9/2079* (2013.01); *F16H 61/16* (2013.01); *G06K 9/00791* (2013.01); *H04N 7/183* (2013.01); *B60R 2300/80* (2013.01); *E02F 3/34* (2013.01)

(58) Field of Classification Search
CPC ... E02F 9/20; E02F 9/2079; E02F 9/26; E02F 9/261; F16H 61/16; F16H 61/0213; G06K 9/00791; B60R 2300/80
See application file for complete search history.

(56) References Cited

U.S. PATENT DOCUMENTS

| | | | |
|---|---|---|---|
| 2007/0181361 A1* | 8/2007 | Stratton | E02F 3/847 180/315 |
| 2014/0003900 A1* | 1/2014 | Hyodo | G05G 9/047 414/685 |

(Continued)

FOREIGN PATENT DOCUMENTS

| | | |
|---|---|---|
| JP | 2008133657 | 6/2008 |
| JP | 04575334 | 11/2010 |

*Primary Examiner* — Huan Lee

(57) ABSTRACT

A system for controlling an operation of a machine is disclosed. The system includes an image capturing device and a controller. The image capturing device generates a signal indicative of a surrounding area of the machine. The controller is in communication with the image capturing device. The controller determines a preceding work cycle of the machine comprising a dig segment and determines a preceding segment associated with the preceding work cycle to be a dump segment. The controller further identifies a work aggregate within the surrounding area of the machine, when the preceding segment of the preceding work cycle is the dump segment. Further, the controller determines a distance between an implement of the machine and the work aggregate and issues a shift request to downshift a gear drive of a transmission system of the machine, if the distance is less than a predefined distance.

20 Claims, 6 Drawing Sheets

(56) References Cited

U.S. PATENT DOCUMENTS

| | | | |
|---|---|---|---|
| 2014/0052351 A1* | 2/2014 | Weber | F16H 61/0213 |
| | | | 701/51 |
| 2014/0095036 A1* | 4/2014 | Hoff | B60W 10/11 |
| | | | 701/65 |

* cited by examiner

SYSTEM AND METHOD FOR CONTROLLING OPERATION OF MACHINE

TECHNICAL FIELD

The present disclosure generally relates to a system and a method for controlling an operation of a machine.

BACKGROUND

Existing autoshift on machines such as heavy machinery is generally based on transmission speed and/or torque. Sometimes during working of the machine at a worksite, there may be a need for a shift in a transmission system of the machine in advance, based on other parameters, such as a work location at the worksite. In an example, during operation of the machine, such as a wheel loader, an implement of the wheel loader contacts a pile or a work aggregate before downshifting of gear drive from higher gear to a first gear. Downshifting to the first gear provides higher torque for penetration of the implement into the work aggregate. Operator may experience jerks due to penetration of the implement into the work aggregate before downshifting to the first gear. Thus, a penetration force caused by the implement at beginning of digging operation may get reduced.

Japanese patent publication number 2008133657, hereinafter referred as the '657 patent, describes an excavation/loading machine and automatic excavation method. A wheel loader in the '657 patent includes a laser range sensor. A laser beam is emitted downwardly from the laser range sensor and the wheel loader measures a distance to an emitting position on a ground while moving forward. When the wheel loader approaches sediment to be excavated, a measured distance reaches a specified distance. Thus rotational speed of an engine of the wheel loader is increased by an instruction. Also, a tilt amount of the engine at which the rotational speed is transmitted to rear wheel is controlled.

SUMMARY OF THE DISCLOSURE

In one aspect of the present disclosure, a system for controlling an operation of a machine is provided. The system includes an image capturing device and a controller. The image capturing device is disposed on the machine. The image capturing device is configured to generate a signal indicative of a surrounding area of the machine. The controller is configured to be in communication with the image capturing device. The controller is configured to determine a preceding work cycle of the machine comprising a dig segment. The controller is further configured to determine a preceding segment associated with the preceding work cycle to be a dump segment. The controller is further configured to identify a work aggregate within the surrounding area of the machine, when the preceding segment of the preceding work cycle is the dump segment. The controller is further configured to determine a distance between an implement of the machine and the work aggregate. The controller is further configured to issue a shift request to downshift a gear drive of a transmission system of the machine, if the distance is less than a predefined distance.

In another aspect of the present disclosure, a machine is provided. The machine includes a frame and a system disposed on the frame for controlling an operation of the machine. The system includes an image capturing device and a controller. The image capturing device is disposed on the machine. The image capturing device is configured to generate a signal indicative of a surrounding area of the machine. The controller is configured to be in communication with the image capturing device. The controller is configured to determine a preceding work cycle of the machine comprising a dig segment. The controller is further configured to determine a preceding segment associated with the preceding work cycle to be a dump segment. The controller is further configured to identify a work aggregate within the surrounding area of the machine, when the preceding segment of the preceding work cycle is the dump segment. The controller is further configured to determine a distance between an implement of the machine and the work aggregate. The controller is further configured to issue a shift request to downshift a gear drive of a transmission system of the machine, if the distance is less than a predefined distance.

In yet another aspect of the present disclosure, a method of controlling an operation of a machine is provided. The method includes determining a preceding work cycle of the machine comprising a dig segment. The method further includes determining a preceding segment associated with the preceding work cycle to be a dump segment. The method further includes identifying a work aggregate within the surrounding area of the machine, when the preceding segment of the preceding work cycle is a dump segment. The method further includes determining a distance between an implement of the machine and the work aggregate. The method also includes issuing a shift request to downshift a gear drive of a transmission system of the machine, if the distance is less than a predefined distance.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
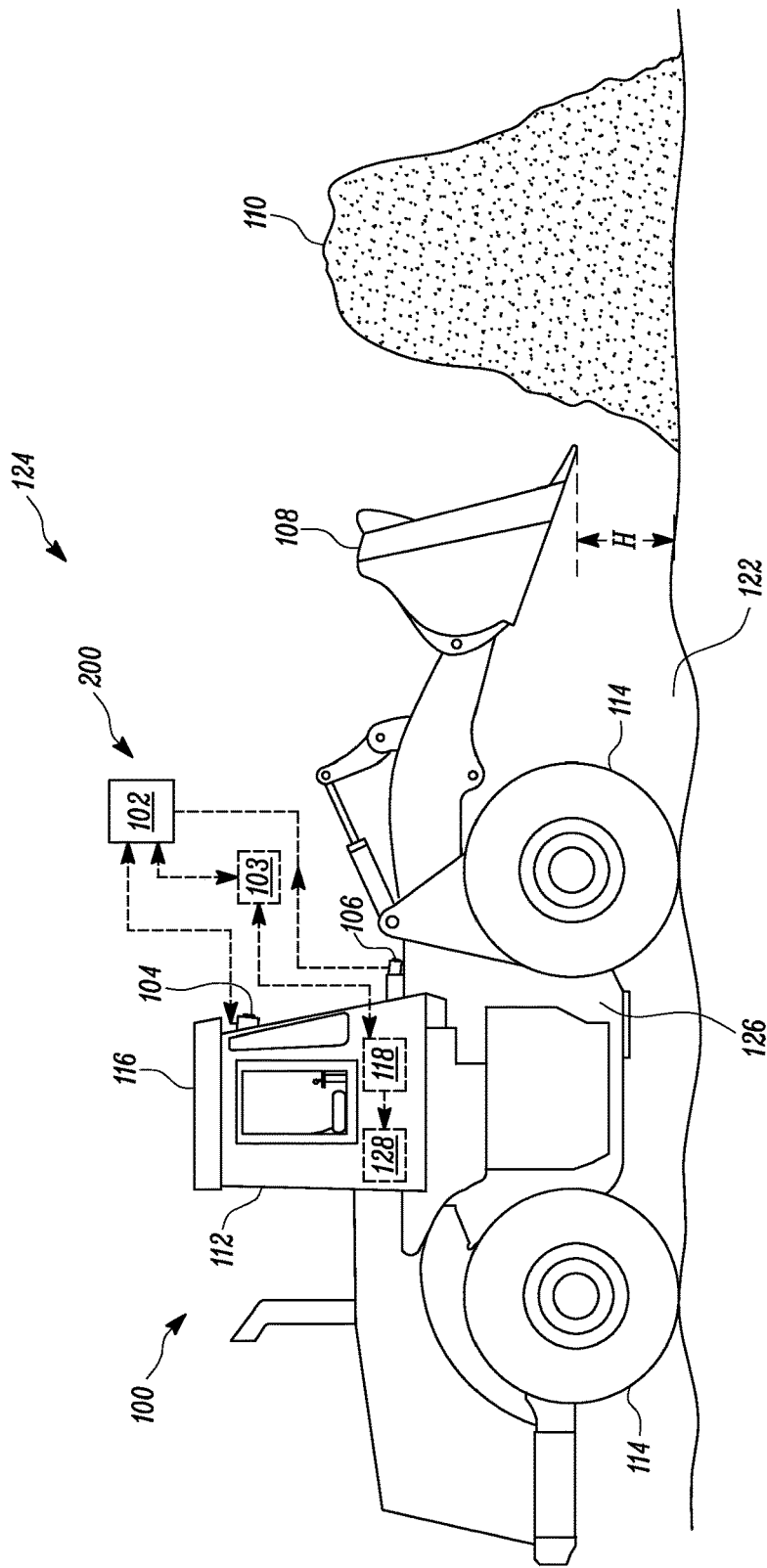
FIG. 1 is a schematic side view of a machine at a worksite, according to an aspect of the present disclosure.

FIG. 1 illustrates a schematic side view of a machine 100 at a worksite 124, according to an aspect of the present disclosure. The machine 100 may be heavy machinery. For example, the machine 100 may embody a mobile machine such as, but not limited to, a wheel loader as depicted in the FIG. 1. The machine 100 may also include a backhoe loader, a highway haul truck, or any other type of mobile machine known in the art. The machine 100 may perform tasks such as, but not limited to, mining, construction, farming, transportation, or any other tasks known in the art.

The machine 100 includes a frame 126 and an implement 108 coupled to the frame 126. The implement 108 may include a bucket, a fork arrangement, a blade, a shovel, a ripper, a dump bed, a broom, a snow blower, a propelling device, a cutting device, a grasping device, or any other task-performing device known in the art. The implement 108 may be connected to the machine 100 by a pivot member, a linkage system, and one or more hydraulic cylinders. The implement 108 may be configured to pivot, rotate, slide, swing, lift, or move relative to the frame 126 of the machine 100 in any manner known in the art. The machine 100 further includes an operator cabin 112 disposed onto the frame 126. The operator cabin 112 may include a roof 116 at top of the operator cabin 112, a dashboard (not shown), an electronic control module (not shown), a gear lever (not shown) connected to a gear drive 128 of a transmission system 118. The transmission system 118 is connected with a traction device 114 and a system 200 for controlling operation of the machine 100. The traction device 114 facilitates movement of the machine 100 on a ground surface 122 at the worksite 124.

The system 200 includes an image capturing device 104 and a controller 102. In one aspect, the image capturing device 104 may be disposed at front of the operator cabin 112 and below the roof 116 of the operator cabin 112. In another aspect, the image capturing device 104 may be disposed at any location in the machine 100. The system 200 further includes a sensing unit 106. The sensing unit 106 is disposed on the implement 108 to determine a position of the implement 108 with reference to the ground surface 122. Particularly, the sensing unit 106 is in electric communication with the controller 102 of the machine 100 for transmitting a signal indicative of the position of the implement 108 with reference to the ground surface 122. The sensing unit 106 may include a position sensor, an angle sensor, a camera, radar proximity sensor or any other sensor to generate a signal indicative of the position of the implement 108 with reference to the ground surface 122. In an exemplary aspect, the machine 100 may be moved towards approaching a work aggregate 110 of a material for operation at the worksite 124. The work aggregate 110 may include any material that is to be loaded to the implement 108 of the machine 100 and dumped at another location. For example, the work aggregate 110 may include sand, gravel, dirt, debris and the like and/or mixtures thereof.

Figure 2:
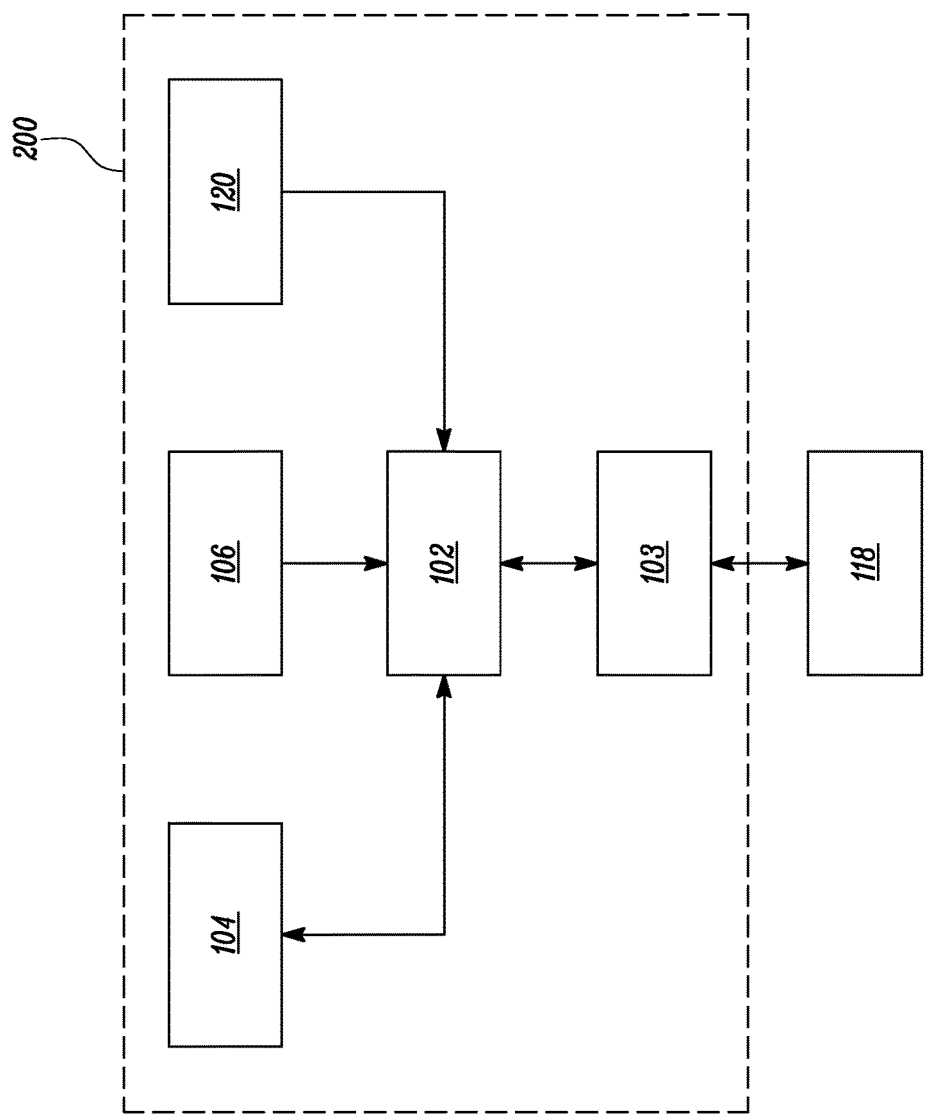
FIG. 2 is a block diagram of a system of the machine, according to an aspect of the present disclosure.

FIG. 2 illustrates a block diagram of the system 200 of the machine 100, according to an aspect of the present disclosure. The system 200 includes the image capturing device 104 configured to capture an image of a surrounding areas 'A1', 'A2' (shown in FIGS. 4 and 5) around the machine 100. The image captured by the image capturing device 104 is transmitted to the controller 102, as a signal, to determine presence of the work aggregate 110 in the surrounding areas 'A1', 'A2' of the machine 100. In the illustrated aspect, the image capturing device 104 is a camera. In other aspects, the image capturing device 104 may be any other device which may capture an image of the surrounding areas 'A1', 'A2' and communicate the image to the controller 102. In an aspect, the image capturing device 104 may be operated to change orientation of the image capturing device 104 in 360 degrees. The image capturing device 104 may be operated by the operator via the controller 102.

The system 200 further includes a proximity sensing device 120 configured to determine a distance between the implement 108 and the work aggregate 110 based on the image captured by the image capturing device 104. In one aspect, the proximity sensing device 120 may be integrated with the controller 102. In another aspect, the proximity sensing device 120 may be separately communicated to the controller 102. In yet another aspect, the proximity sensing device 120 may be disposed on the machine 100. It may also be contemplated that the image capturing device 104 may be integrated with the proximity sensing device 120. The proximity sensing device 120 may include a camera, a radar sensor, a sensor or any other device which serves the purpose of determining distance between the implement 108 and the work aggregate 110.

The controller 102 is further in communication with a transmission control unit 103 associated with the transmission system 118. The transmission system 118 may be configured to execute operations for forward traveling and rearward traveling of the machine 100 and gear shifting through the gear drive 128 (shown in the FIG. 1) based on an input received from the transmission control unit 103. The transmission control unit 103 is configured to issue a command to the gear drive 128 of the transmission system 118 to upshift or downshift the gear drive 128 based on an input received from the controller 102. In an example, the transmission control unit 103 may be in communication with one or more of various control units, such as the engine control unit, an implement control unit, and various known control units disposed in the machine 100. The gear drive 128 provides torque to the traction devices 114 of the machine 100. The gear drive 128 provides different gear ratios for varying speed of the machine 100 and for changing driving direction between forward and backward movements. In an exemplary aspect of the present disclosure, the transmission system 118 may include a hydraulic system (not shown) to actuate the gear drive 128 and hence to define a different gear ratios. The hydraulic system may include one or more control valves to control a flow and a direction of hydraulic fluid. The one or more control valves may be configured to receive signals from the controller 102 to actuate the gear drive 128 and select a gear ratio based on the signal.

Figure 3:
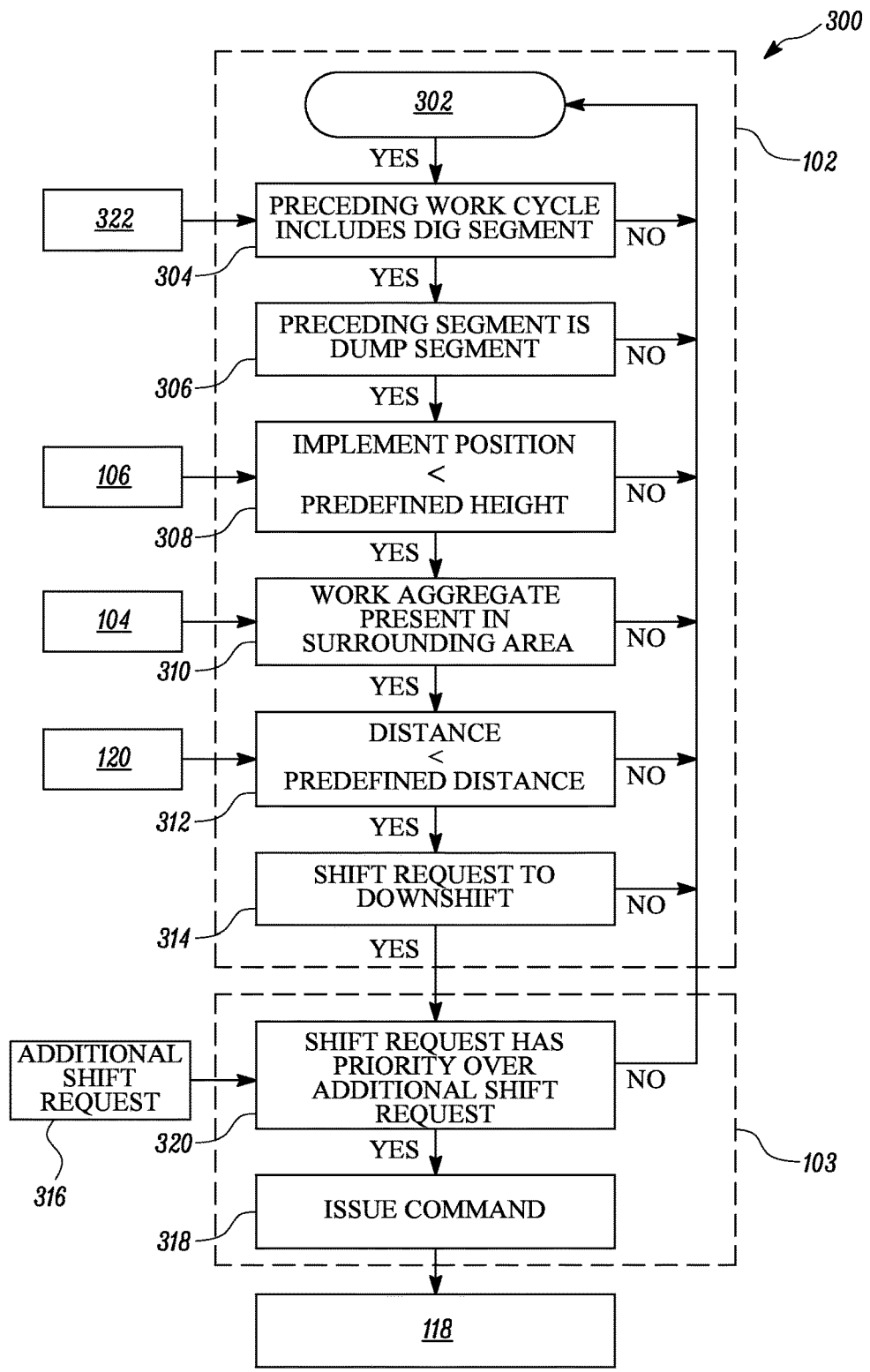
FIG. 3 is a flowchart of a method for controlling an operation of the machine, according to an aspect of the present disclosure.

FIG. 3 is a flowchart of a method 300 of controlling an operation of the machine 100, according to an aspect of the present disclosure. The method 300 of controlling the operation is performed by the controller 102 of the system 200. At block 302, the method 300 of controlling the operation is initiated. At the block 302, the controller 102 may receive a signal from an Electronic Control Module (ECM) (not shown). In one example, the ECM may be configured to control various components of machine 100, such as the transmission system 118, the engine and other components of the machine 100. In another example, the ECM may be configured to be in communication with various other control units, such as the Transmission Control Unit 103 associated with the transmission system 118, an Engine Control Unit (ECU) associated with an engine (not shown) and other control units associated with the various components of the machine 100. The controller 102 identifies whether the engine of the machine 100 is in ON mode or OFF mode based on the signal received from the ECM. In one aspect, the controller 102 may be integrated with the ECM. In another aspect, the controller 102 may be separately communicated with the ECM. Thus, the controller 102 in communication with engine may determine whether the engine is in ON mode or OFF mode. If the engine of the machine 100 is determined to be in ON mode, the method 300 proceeds to next block 304.

At the block 304, the controller 102 determines if a preceding work cycle of the machine 100 includes a dig segment. The controller 102 is in communication with a memory module 322 that is configured to store a predefined pattern of a work cycle. The predefined pattern of the work cycle may be stored in the memory module 322 before start of the operation of the machine 100. The predefined pattern of the work cycle may include various work segments that are to be carried out by the machine 100. The operation of the machine 100 may be performed by repetition of the various work segments of the work cycle. In an aspect, the memory module 322 includes a cycle segmentation algorithm defined based on the various work segments such as, but not limited to, a digging segment, a loading segment, a dumping segment and an emptying segment. It may also be contemplated that the various work segments of the work cycle may be defined based on the operation that is to be carried out in the worksite 124 on the ground surface 122. The controller 102 may determine if the preceding work cycle includes the dig segment, based on a comparison between the predefined pattern of the work cycle stored in the memory module 322 and an actual work cycle of the machine 100 performed by the machine 100.

At block 306, the controller 102 determines if a preceding segment associated with the preceding work cycle includes a dump segment. If the preceding segment associated with the preceding work cycle is the dump segment, then the controller 102 proceeds to the block 308. At the block 308, the controller 102 determines if the implement 108 is located at a height (shown in the FIG. 1) less than a predefined height 'H' (shown in the FIG. 1) from the ground surface 122 using a sensing unit 106 configured in the system 200. The sensing unit 106 communicates through a signal to the controller 102 to indicate the position of the implement 108 on the ground surface 122. At block 310, if the implement 108 is determined to be present at a height less than the predefined height 'H', then the controller 102 proceeds to identify if the work aggregate 110 is present within the surrounding area of the machine 100. The signal to indicate the presence of the work aggregate 110 within the surrounding area may be provided by the image capturing device 104. In an aspect of the present disclosure, the image captured indicates presence of the work aggregate 110 at front of the machine 100.

At block 312, the controller 102 determines if a distance 'D' (shown in FIGS. 4 and 5) between the implement 108 and the work aggregate 110 is less than a predefined distance 'PD'. In an aspect of the present disclosure, the predefined distance 'PD' may be defined based on various operation parameters of the transmission system 118 and the machine 100, such as a ground speed of the machine 100 and a gear ratio of the gear drive 128. Further, predefined distance 'PD' may be a minimum distance required by the machine 100 during downshifting of the gear drive 128 from a higher gear to a lower gear, such as the first gear. If the distance 'D' is determined to be less than the predefined distance 'PD', then the controller 102 proceeds to block 314. At the block 314, the controller 102 instructs the shift request to downshift the gear drive 128. In an aspect of the present disclosure, the shift request is defined as a downshift request which includes, but not limited to, shifting of the gear drive 128 from a higher gear to a lower gear. In an exemplary aspect, the higher gear may include gears such as a second gear, a third gear, a fourth gear, a fifth gear. In an exemplary aspect, the lower gear may include a first gear.

At block 316, an additional shift request is determined based on one or more operating parameters of the machine 100. In one aspect of the present disclosure, the additional shift request may be determined by the transmission control unit 103 that is in communication with the various control units. In another aspect of the present disclosure, the additional shift request is defined as a signal issued by one or more of the various control units. The additional shift request may include actions such as, but not limited to, upshifting of the gear drive 128 from a lower gear to a higher gear to perform operations of the machine 100. In an exemplary aspect of the disclosure, the operation of the machine 100 may include, but not limited to, movement of the machine 100 from one place to other place, positioning the implement 108 to desired location etc. In one aspect, the transmission shift control logic may be defined within the controller 102. In another aspect, the controller 102 may be in communication with the Electronic Control Module (ECM), in which the transmission shift control logic is defined. The transmission control unit 103 further compares the signals indicative of the shift request received from the controller 102 and the additional shift request received from one or more of the various control units. At block 320, if the signal indicative of the shift request received from the controller 102 has priority over the additional shift request, then the transmission control unit 103 issues a command, at block 318, to the transmission system 118 to downshift the gear drive 128 to the first gear. In an example, if the controller 102 issues a shift request indicative of a downshift of the gear drive 128 to the transmission control unit 103 when it is only 0.5 seconds since the gear drive 128 is upshifted, then the shift request from the controller 102 will be inhibited.

Also, if the controller 102 identifies that the additional shift request has priority over the shift request received from the controller 102, then the transmission control unit 103 issues a command to the transmission system 118 to perform a shifting operation based on the additional shift request. The additional shift request may correspond to a command to the transmission control unit 103 to shift the gear drive 128 from a higher gear to a lower gear or a lower gear to a higher gear for carrying out any other operations of the machine 100 apart from the digging operation.

Figure 4:
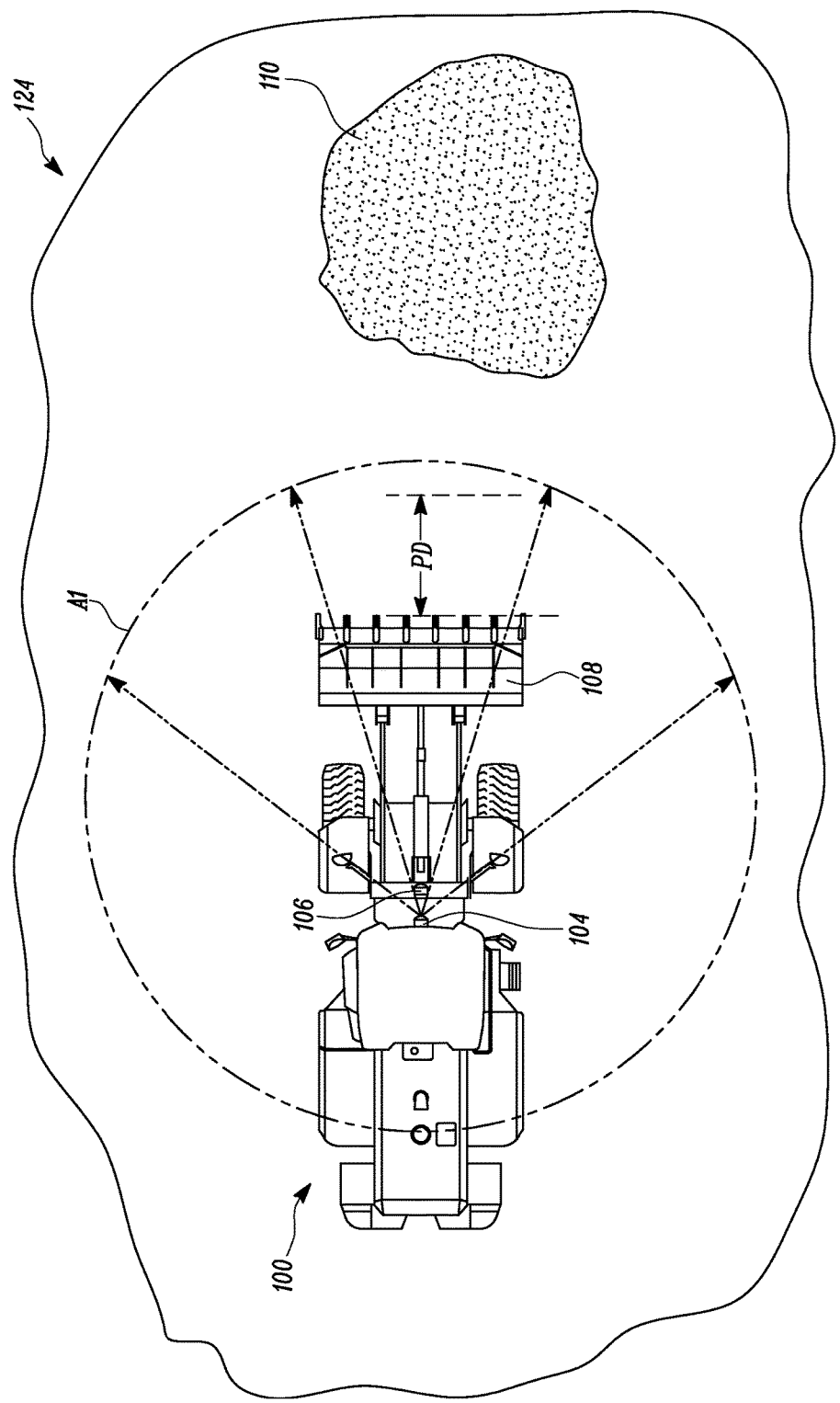
FIG. 4 is a top view of the worksite showing the machine at a first location with reference to a work aggregate, according to an exemplary aspect of the present disclosure.

FIG. 4 illustrates a top view of the worksite 124 showing the machine 100 at a first location with reference to the work aggregate 110, according to an exemplary aspect of the present disclosure. The image capturing device 104 captures an image covering the first surrounding area 'A1' (indicated by an imaginary circle) and determines that the image captured by the image capturing device 104 does not include an image of the work aggregate 110. The first surrounding area 'A1' is an area of the worksite 124 captured by the image capturing device 104, at the first location of the machine 100, in which there is no presence of the work aggregate 110 in the image captured. The controller 102 which is in communication with the image capturing device 104 is configured to determine if a heap of materials present ahead of the machine 100 is the work aggregate 110, by mapping the captured image with the pre-programmed images in the memory module 322 associated with the controller 102. In another aspect, the image captured by the image capturing device 104 may be made to display at a dashboard (not shown) of the machine 100 through which the operator may identify if the image captured by the image capturing device 104 includes an image of the work aggregate 110 or any other material apart from the work aggregate 110.

In an aspect of the present disclosure, the proximity sensing device 120 (shown in FIG. 2) determines a distance between the implement 108 and the work aggregate 110. If the determined distance is more than the predefined distance 'PD', then the controller 102 instructs the machine 100 to perform its operation without downshifting the gear drive 128 to the first gear.

Figure 5:
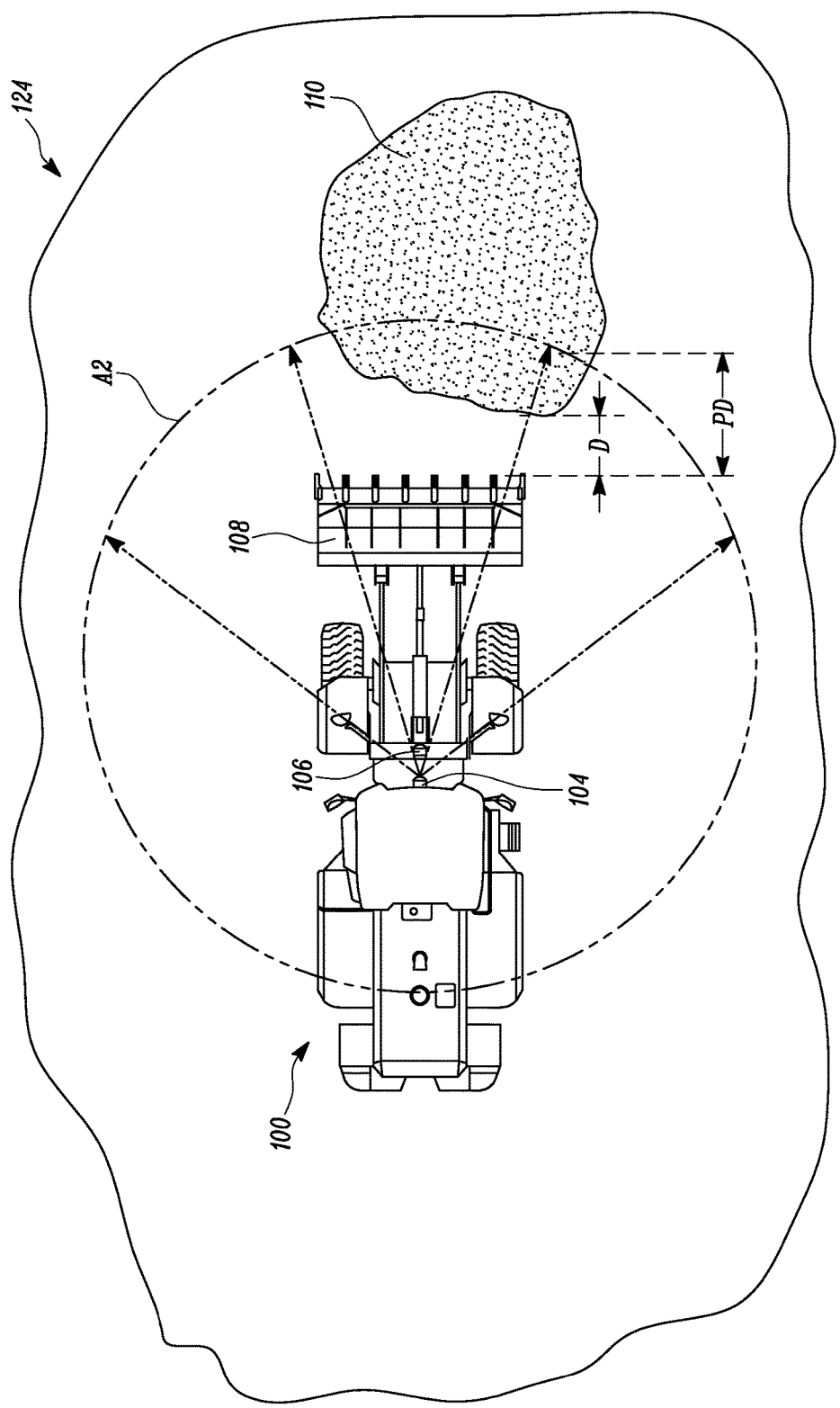
FIG. 5 is a top view of the worksite showing the machine at a second location with reference to the work aggregate, according to an exemplary aspect of the present disclosure.

FIG. 5 illustrates a top view of the worksite 124 showing the machine 100 at a second location with reference to the work aggregate 110, according to an exemplary aspect of the present disclosure. The image capturing device 104 determines that the work aggregate 110 is present at front of the machine 100 and is within a second surrounding area 'A2' (indicated by an imaginary circle. The second surrounding area 'A2' is an area of the worksite 124 captured by the image capturing device 104, at the second location of the machine 100, in which there is the work aggregate 110 in the image captured.

The proximity sensing device 120 (shown in FIG. 2) determines a distance between the implement 108 and the work aggregate 110 as a distance 'D'. The distance 'D' is less than the predefined distance 'PD' which is determined by the controller 102. As the distance 'D' is less than the predefined distance 'PD', the controller 102 instructs the machine 100 to perform the operation as defined by the shift request for downshifting the gear drive 128 to the first gear. The controller 102 is adapted to proceed for digging operation only when the distance 'D' measured between the implement 108 and the work aggregate 110 is less than the predefined distance 'PD'. Thus, the controller 102 after obtaining the signals from both the image capturing device 104 and the proximity sensing device 120 analyses and issues a command to the transmission system 118 of the machine 100 to downshift the gear drive 128 to the first gear for carrying out the digging operation. In an exemplary embodiment, the controller 102 is adapted to proceed the method to digging operation when the distance 'D' measured between the implement 108 and the work aggregate 110 is equal to the predefined distance 'PD'.

INDUSTRIAL APPLICABILITY

The present disclosure relates to the system 200 and a method 600 of controlling the operation of the machine 100. The system 200 includes the controller 102 in communication with the image capturing device 104 and the sensing unit 106 for controlling the operation of the machine 100 by downshifting the gear drive 128 during digging operation of the machine 100. Further, impact load caused by the engagement of the implement 108 with the work aggregate 110 is minimized during the digging operation. Further, an operator of the machine 100 may also find easy operation of the machine 100. Also, an overall efficiency and productivity of the machine 100 and the operator are improved. Further, durability of various components of the machine 100 may be increased.

Figure 6:
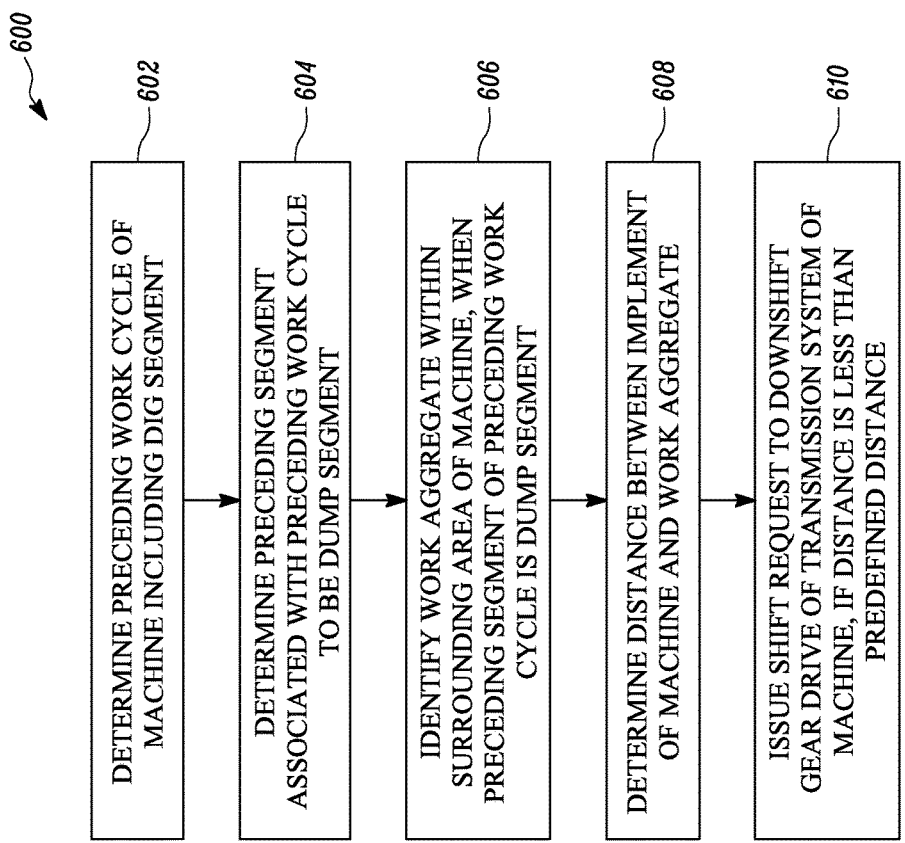
FIG. 6 is a flow chart of a method of controlling an operation of the machine, according to another aspect of the present disclosure.

FIG. 6 illustrates a flow chart of the method 600 of controlling the operation of the machine 100, according to an aspect of the present disclosure. The method 600 includes activities performed by the controller 102 and the image capturing device 104 for operation of the machine 100. The controller 102 identifies if the machine 100 is in ON mode or OFF mode. If the machine 100 is identified to be in ON mode, then the controller 102 initiates the method 600 of controlling the operation of the machine 100. At step 602, the method 600 includes determining whether the preceding work cycle of the machine 100 includes the dig segment. If the preceding work cycle includes the dig segment, then the controller 102 determines if the preceding segment associated with the preceding work cycle is the dump segment, at step 604. If the controller 102 determines that the preceding segment is the dump segment, then the controller 102 further identifies if the work aggregate 110 is present within the surrounding area of the machine 100, at the step 606. If the work aggregate 110 is present within the surrounding area, the controller 102 determines the distance between the implement 108 of the machine 100 and the work aggregate 110, at step 608. After determining the distance between the implement 108 and the work aggregate 110, the controller 102 determines if the distance is less than the predefined distance 'PD'. If the determined distance is less than the predefined distance 'PD', the controller 102 issues the signal indicative of the shift request to the transmission control unit 103 to downshift the gear drive 128, at step 610. Thus, the downshifting of the gear drive 128, for example, from a second gear to a first gear enables the operator to perform the digging operation at the worksite 124 without any jerks as the gear drive 128 is shifted to the first gear before the machine 100 hitting to the work aggregate 110.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for controlling an operation of a machine, the system comprising:
    an image capturing device disposed on the machine, the image capturing device configured to generate a signal indicative of a surrounding area of the machine; and
    a controller in communication with the image capturing device, the controller configured to:
        determine a preceding work cycle of the machine comprising a dig segment;
        determine a preceding segment associated with the preceding work cycle to be a dump segment;
        identify a work aggregate within the surrounding area of the machine, when the preceding segment of the preceding work cycle is the dump segment;
        determine a distance between an implement of the machine and the work aggregate; and
        issue a shift request to downshift a gear drive of a transmission system of the machine, if the distance is less than a predefined distance.

2. The system of claim 1 comprising a sensing unit disposed on the implement, the sensing unit configured to generate a signal indicative of a position of the implement with reference to a ground surface.

3. The system of claim 2, wherein the controller is in communication with the sensing unit, and configured to determine the position of the implement to be within a predefined height from the ground surface.

4. The system of claim 1, wherein the controller is configured to verify:
    if the preceding work cycle of the machine comprising the dig segment;

if the preceding segment associated with the preceding work cycle to be the dump segment;
if the work aggregate is within the surrounding area of the machine; and
if the distance between the implement and the work aggregate is less than the predefined distance.

5. The system of claim 1, wherein the controller is in communication with a transmission control unit associated with the transmission system, and wherein the transmission control unit is configured to:
receive a signal indicative of the shift request;
receive a signal indicative of an additional shift request determined based on one or more operating parameters of the machine;
compare the signals indicative of the shift request and the additional shift request; and
issue a command to the transmission system to downshift the gear drive if the signal indicative of the shift request has priority over the signal indicative of the additional shift request.

6. The system of claim 5, wherein the controller is configured to analyze the preceding work cycle comprises the dig segment, if the signal indicative of the additional shift request has priority over the shift request.

7. The system of claim 1, wherein the image capturing device comprises a camera.

8. A machine comprising:
a frame; and
a system disposed on the frame for controlling an operation of the machine, the system comprising:
an image capturing device configured to generate a signal indicative of a surrounding area of the machine; and
a controller in communication with the image capturing device, the controller configured to:
determine a preceding work cycle of the machine comprising a dig segment;
determine a preceding segment associated with the preceding work cycle to be a dump segment;
identify a work aggregate within the surrounding area of the machine, when the preceding segment of the preceding work cycle is a dump segment;
determine a distance between an implement of the machine and the work aggregate; and
issue a shift request to downshift a gear drive of a transmission system of the machine, if the distance is less than a predefined distance.

9. The machine of claim 8, wherein the system comprises a sensing unit disposed on the implement, and wherein the sensing unit is configured to generate a signal indicative of a position of the implement with reference to a ground surface.

10. The machine of claim 9, wherein the controller is configured to determine the position of the implement to be within a predefined height from the ground surface.

11. The machine of claim 8, wherein the controller is configured to verify:
if the preceding work cycle of the machine comprising the dig segment;
if the preceding segment associated with the preceding work cycle to be the dump segment;
if the work aggregate is within the surrounding area of the machine; and
if the distance between the implement and the work aggregate is less than the predefined distance.

12. The machine of claim 8, wherein the controller is in communication with a transmission control unit associated with the transmission system, and wherein the transmission control unit is configured to:
receive a signal indicative of the shift request;
receive a signal indicative of an additional shift request determined based on one or more operating parameters of the machine;
compare the signals indicative of the shift request and the additional shift request; and
issue a command to the transmission system to downshift the gear drive if the signal indicative of the shift request has priority over the signal indicative of the additional shift request.

13. The machine of claim 8, wherein the controller is configured to analyze the preceding work cycle comprises the dig segment, if the signal indicative of the additional shift request has priority over the shift request.

14. The machine of claim 8, wherein the image capturing device comprises a camera.

15. A method of controlling an operation of a machine, the method comprising:
determining a preceding work cycle of the machine comprising a dig segment;
determining a preceding segment associated with the preceding work cycle to be a dump segment;
identifying a work aggregate within the surrounding area of the machine, when the preceding segment of the preceding work cycle is a dump segment;
determining a distance between an implement of the machine and the work aggregate; and
issuing a shift request to downshift a gear drive of a transmission system of the machine, if the distance is less than a predefined distance.

16. The method of claim 15 comprising, generating, via a sensing unit, a signal indicative of a position of the implement with reference to a ground surface.

17. The method of claim 16 comprising, determining the position of the implement to be within a predefined height from the ground surface.

18. The method of claim 15 further comprising, verifying, via the controller:
if the preceding work cycle of the machine comprising the dig segment;
if the preceding segment associated with the preceding work cycle to be the dump segment;
if the work aggregate is within the surrounding area of the machine; and
if the distance between the implement and the work aggregate is less than the predefined distance.

19. The method of claim 15 further comprising:
receiving, using a transmission control unit, a signal indicative of the shift request;
receiving, using the transmission control unit, a signal indicative of an additional shift request determined based on one or more operating parameters of the machine;
comparing the signals indicative of the shift request and the additional shift request; and
issuing a command to the transmission system to downshift the gear drive if the signal indicative of the shift request has priority over the additional shift request.

20. The method of claim 15 further comprising, analyzing the preceding work cycle comprises the dig segment, if the signal indicative of the additional shift request has priority over the shift request.

* * * * *